US011228578B2

(12) United States Patent
Vasudevan et al.

(10) Patent No.: US 11,228,578 B2
(45) Date of Patent: Jan. 18, 2022

(54) MULTI-FACTOR AUTHENTICATION UTILIZING EVENT DATA

(71) Applicant: INTERNATIONAL BUSINESS MACHINES CORPORATION, Armonk, NY (US)

(72) Inventors: Cheranellore Vasudevan, Bastrop, TX (US); Swaminathan Balasubramanian, Troy, MI (US); Sibasis Das, Kolkata (IN); Priyansh Jaiswal, Boca Raton, FL (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 16/414,987

(22) Filed: May 17, 2019

(65) Prior Publication Data

US 2020/0366665 A1  Nov. 19, 2020

(51) Int. Cl.
*H04L 29/06* (2006.01)
*H04L 29/08* (2006.01)

(52) U.S. Cl.
CPC ........ *H04L 63/0815* (2013.01); *H04L 63/083* (2013.01); *H04L 63/105* (2013.01); *H04L 63/107* (2013.01); *H04L 67/22* (2013.01); *H04L 2463/082* (2013.01)

(58) Field of Classification Search
CPC . H04L 63/0815; H04L 63/083; H04L 63/107; H04L 63/105; H04L 67/22; H04L 2463/082
USPC ........................................................ 726/1–5
See application file for complete search history.

(56) References Cited

U.S. PATENT DOCUMENTS

| 6,377,691 | B1 | 4/2002 | Swift |
| 8,245,292 | B2 * | 8/2012 | Buer ....................... G06F 21/34 726/20 |
| 8,401,522 | B2 | 3/2013 | Crawford |
| 8,943,548 | B2 | 1/2015 | Drokov |
| 9,332,433 | B1 * | 5/2016 | Dotan ................. H04L 63/0815 |
| 10,089,617 | B2 | 10/2018 | Royyuru |
| 11,023,610 | B2 | 6/2021 | Sharp-Paul |
| 2002/0169988 | A1 | 11/2002 | Vandergeest et al. |

(Continued)

OTHER PUBLICATIONS

Designing and evaluating challenge-question system, M Just, IEEE, 2004 (Year: 2004).*

(Continued)

*Primary Examiner* — Jahangir Kabir
(74) *Attorney, Agent, or Firm* — Tihon Poltavets

(57) ABSTRACT

A method for a two-factor authentication process includes, responsive to determining a first user authentication was prompted in a first application on a first device associated with a user, identifying a second application on a second device based on a user profile associated with the user. The method identifies a first event from a plurality of events that previously occurred in the second application in a select time frame, wherein the first event relates to a first action performed by the user in the second application. The method generates an authentication question based on the first event, wherein the authentication question is a second user authentication. Responsive to determining an answer provided by the user to the authentication question is correct, the method grants access to the first user authentication prompt.

20 Claims, 5 Drawing Sheets

(56) References Cited

U.S. PATENT DOCUMENTS

| | | | |
|---|---|---|---|
| 2004/0189441 | A1 | 9/2004 | Stergiou |
| 2006/0048213 | A1 | 3/2006 | Cheng |
| 2008/0216172 | A1 | 9/2008 | Forman |
| 2008/0313719 | A1 | 12/2008 | Kaliski, Jr. |
| 2013/0333003 | A1* | 12/2013 | Roy .................. G06F 21/40 726/5 |
| 2015/0154387 | A1* | 6/2015 | Cockcroft ............ H04W 12/06 726/6 |
| 2016/0164866 | A1* | 6/2016 | Oberheide .......... H04L 63/0876 726/1 |
| 2016/0164870 | A1* | 6/2016 | Grigg .................. H04L 63/083 726/7 |
| 2018/0046796 | A1 | 2/2018 | Wright |
| 2019/0385143 | A1* | 12/2019 | Reiss .................. G06Q 20/425 |
| 2019/0386984 | A1* | 12/2019 | Thakkar ................ H04L 63/18 |
| 2020/0084204 | A1* | 3/2020 | Craswell ............ H04L 63/0853 |

OTHER PUBLICATIONS

IBM, List of IBM Patents or Patent Applications Treated as Related, Appendix P, dated May 28, 2019, 2 pages.

Pending U.S. Appl. No. 16/415,000, filed ,5/17/29 entitled: "Event Data Fencing Based on Vulnerability Detection".

Aman et al., "4-D Password: Strengthening the Authentication Scene", International Journal of Scientific & Engineering Research, vol. 3, Issue 10, Oct. 2012, http://www.ijser.org/researchpaper/4-d-password-strengthening-the-authenticaion-scene.pdf., pp. 1-6.

Arora et al., "4D Password Scheme", International Journal of Engineering Research & Technology (IJERT), ISSN 2278-0181, ICIATE—2017 Conference Proceedings, pp. 1-4.

Bhandari, Internet Banking: "Legal and Security Issues Vis a Vis Regulatory Framework in India", Diss., Feb. 2017, pp. 1-155.

Jain et al., "New Directions in Social Authentication", USEC '15, Feb. 8, 2015, San Diego, CA, USA, pp. 1-6.

Merschen, "Chip in the U.S.—The Facts—Debunking the myths concerning EMV advancement in the United States", htttps://www.securetechalliance.org/resources/pdf/Chip_in_the_US_The_Facts_090611.pdf, archive date Sep. 6, 2011.

Peterson et al.,. "Architectural Risk Analysis." Cigital, Inc., (2005), http://www.us-cert.gove/bsi/articles/best-practices/architectual-rishkan . . . , pp. 1-20.

Rogers, "Why I Hacked Apple's TouchID, and Still Think it is Awesome", Lookout Blog, http://blog.lookout.com/why-i-hacked-apples-touchid-and-still-think-it-is-awesome, Sep. 23, 2013, pp. 1-8.

Saeed, Can AI Detect Fake News?, https://venturebeat.com/2017/05/01/can-ai-detect-fake-news/, May 1, 2017, pp. 1-6.

Wildt, "Three Benefits of Voice Biometrics Solutions"—Interactions, Nov. 17, 2016, http://www.interactions.com/blog/compliance-and-security/benefits-voice . . . , pp. 1-5.

* cited by examiner

MULTI-FACTOR AUTHENTICATION UTILIZING EVENT DATA

FIELD OF INVENTION

This disclosure relates generally to authentication systems, and in particular to multiple factor authentication systems utilizing event data.

BACKGROUND OF THE INVENTION

Typical user authentication methods for accessing an online account or service include a user providing a username and password combination verifiable by a provider of the online account or service. Certain providers of online accounts and service require an additional verification step to access sensitive information (e.g., account and routing numbers) or when the provider's system detects a new device attempting to access an account. The additional verification step can include answering a previously selected question by the user, where an answer to the previously selected question was established months or years prior. However, if the security of the provider becomes compromised by a malicious entity, both the username and password combination, and the answer to the previously selected question become compromised.

SUMMARY

Embodiments in accordance with the present invention disclose a method, computer program product and computer system for a two-factor authentication process, the method, computer program product and computer system can, responsive to determining a first user authentication was prompted in a first application on a first device associated with a user, identify a second application on a second device based on a user profile associated with the user. The method, computer program product and computer system can identify a first event from a plurality of events that previously occurred in the second application in a select time frame, wherein the first event relates to a first action performed by the user in the second application. The method, computer program product and computer system can generate an authentication question based on the first event, wherein the authentication question is a second user authentication. The method, computer program product and computer system can responsive to determining an answer provided by the user to the authentication question is correct, grant access to the first user authentication prompt.

DETAILED DESCRIPTION

Embodiments of the present invention provide a two-factor authentication process that analyzes user produced events across multiple applications and devices, to generate user authentication questions. The two-factor authentication process allows the user to select whether to participate in the event based two-factor authentication process by selecting associated device and applications from which event data can be collected. Furthermore, the extent of the event data collection is further limited by the user via event data parameters which limit the collection of event data for each application to ensure the privacy of the user is maintained. The two-factor authentication process stores the collected event data for a predetermined amount of time and utilizes the event data to verify the user when the user is accessing an application. As a user authentication is prompted in the first application on a first device, the user inputs credentials associated with the prompted user authentication (i.e., first factor). Subsequently, the two-factor authentication process identifies a previous event from a second application on a second device, where the two-factor authentication process analyzes the previous event and generates an authentication question based on the analysis for the user to answer (i.e., second factor). Subsequent to receiving a correct answer to the authentication question, the two-factor authentication process grants the user access to the first application.

Figure 1:
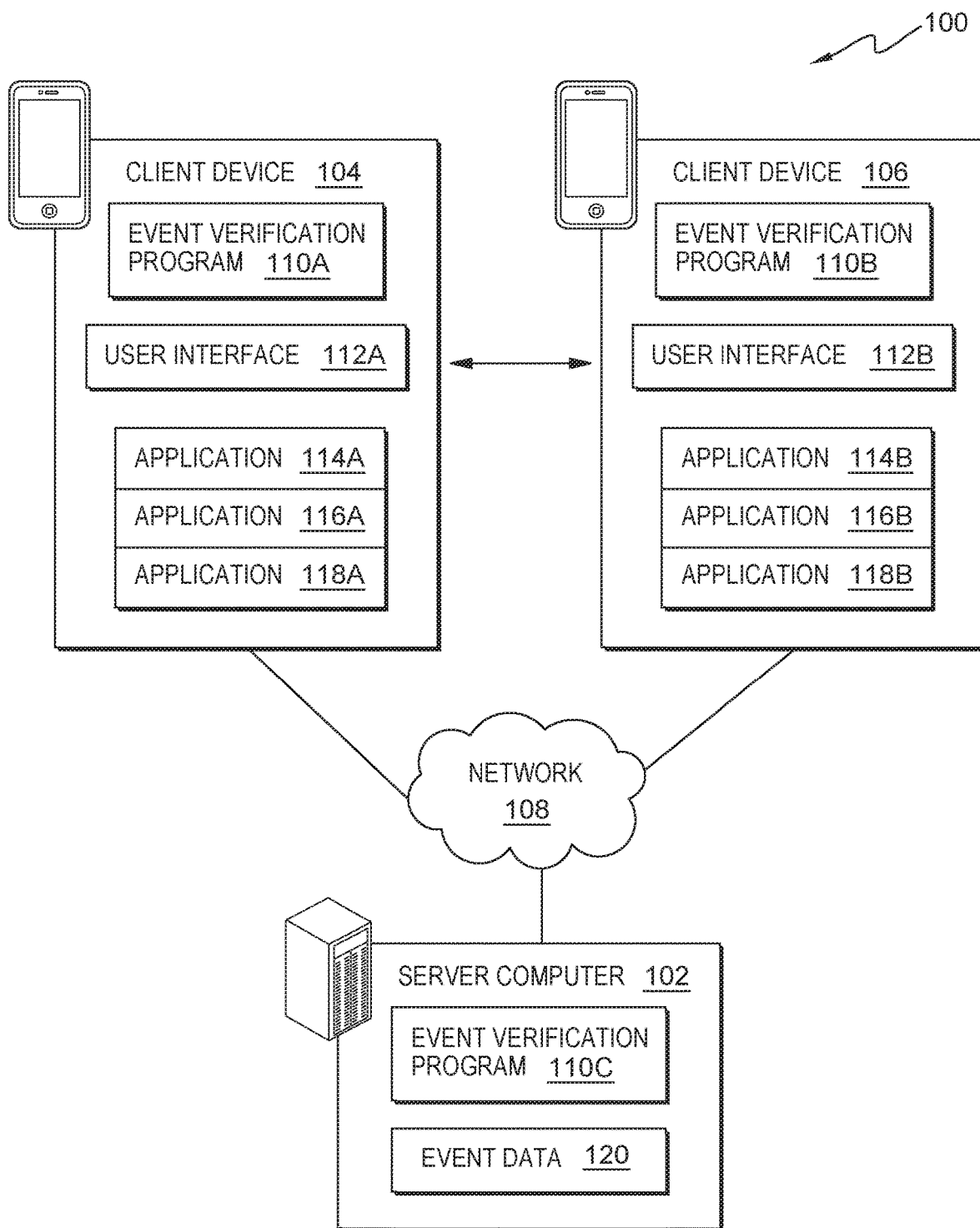
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, client device 104, and client device 106 all interconnected over network 108. For discussion purposes, event verification program 110 can operate on server computer 102, client device 104, and client device 106.

Server computer 102 may be a desktop computer, a laptop computer, a tablet computer, a specialized computer server, a smartphone, or any computer system capable of executing the various embodiments of event verification program 110C. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. In this embodiment, server computer 102 includes event verification program 110C capable of communicating with event verification program 110A and 110B operating on client device 104 and 106, respectively.

Each client device 104 and 106 may be a cellphone, smartphone, smartwatch, laptop, tablet computer, or any other electronic device capable of communicating via network 108. Client device 104 and 106 are each associated with a single user, where the single user has access to various applications (e.g., applications 114, 116, and 118) operating on client device 104 and 106. Applications 114, 116, and 118 represents any program capable of generating kevent data 120 stored on server computer 102 by event verification program 110 while operating on either client device 104 or client device 106. In this embodiment, client device 104 includes user interface 112A, application 114A, 116A, and 118A and client device 106 includes user interface 112B, application 114B, 116B, and 118B. For discussion purposes, application 112A operating on client device 104 represents a first program similar to application 112B operating on client device 106, where application 116A and 116B represent a second program and application 118A and 118B represent a third program. User interface 112A of client device 102 and user interface 112B of client device 104 allows for the single user to interact with any one of event verification program 110, application 114, 116, and 118 operating on their respective client device 104 and 106.

Event data 120 represents an occurrence or action registerable and storable by applications 114, 116, and 118, where event data 120 is also identifiable by the single user of client device 104 and 106. Examples of applications 114, 116, and 118 include but are not limited to banking services, navigation services, shopping service, media streaming services, smart home management program, social media services, and supply chain management programs. Examples of event data 120 includes but is not limited to a recent credit card statement payment via a banking service, a navigated location via a navigation service, a shopping purchase via a shopping service, a home temperature adjustment via a smart home management program, a recently tagged location via a social media service, and a recent sales figure via a supply chain management program.

Event verification program 110A and 110B operating on client device 104 and 106, respectively, collect event data 120 from respective applications 114, 116, and 118 for storage on server computer 102. In this embodiment, event verification program 110C performs the operating steps for managing configuration and collection of event data 120 and a two-factor authentication process. For managing configuration and collection of event data 120, event verification program 110C receives a device selection (e.g., client device 104 or 106) and receives an application selection (i.e., application 114, 116, and 118) for the device selection. Event verification program 110C receives event data parameters for event data 120 collection for the selected application and stores as a user profile, the device selection, the application selection, and the event data parameters. Event verification program 110C monitors application activities based on the user profile and determines whether an application is selected for which event data 120 is collected. Responsive to determining a select application is activated for which event data 120 is collected, event verification program 110C receives event data 120 for the select application based on the user profile. Event verification program 110C stores event data 120 received for the select application, along with a user identifier and a device identifier (i.e., client device 104 or 106).

For the two-factor authentication process, event verification program 110C determines a user authentication was prompted in user interface 112A by application 114A on client device 104 associated with a user. Event verification program 110C identifies another device different from client device 104 (i.e., client device 106), associated with the user based on the profile for the user and identifies another application different from application 114A (i.e., application 116B or 118B) on the other client device. Event verification program 110C identifies a previous event that occurred in the other application in a select time frame (e.g., 12 hours, 7 days etc.) and generates an authentication question based on the previous event (i.e., first factor). Event verification program 110C determines whether the user answers the authentication question correctly and responsive to determining the user has not answered the authentication question correctly and has exceeded the attempt limit, event verification program 110C denies access to the prompted authentication in user interface 112A by application 114A. Subsequently, event verification program 110C sends a notification to the user via a channel provided by a third party (e.g., email). Responsive to determining the user has answered the authentication question correctly, event verification program 110C grants access to the prompted authentication in user interface 112A by application 114A, where the user has the ability to enter authentication credentials (i.e., second factor).

In general, network 108 can be any combination of connections and protocols that will support communications between server computer 102, client device 104, and client device 106. Network 108 can include, for example, a local area network (LAN), a wide area network (WAN), such as the internet, a cellular network, or any combination of the preceding, and can further include wired, wireless, and/or fiber optic connections. In one embodiment, event verification program 110C can be a web service accessible via network 108 to a user of client device 104 and 106. In another embodiment, event verification program 110C may be operated directly by a user of server computer 102.

Figure 2:
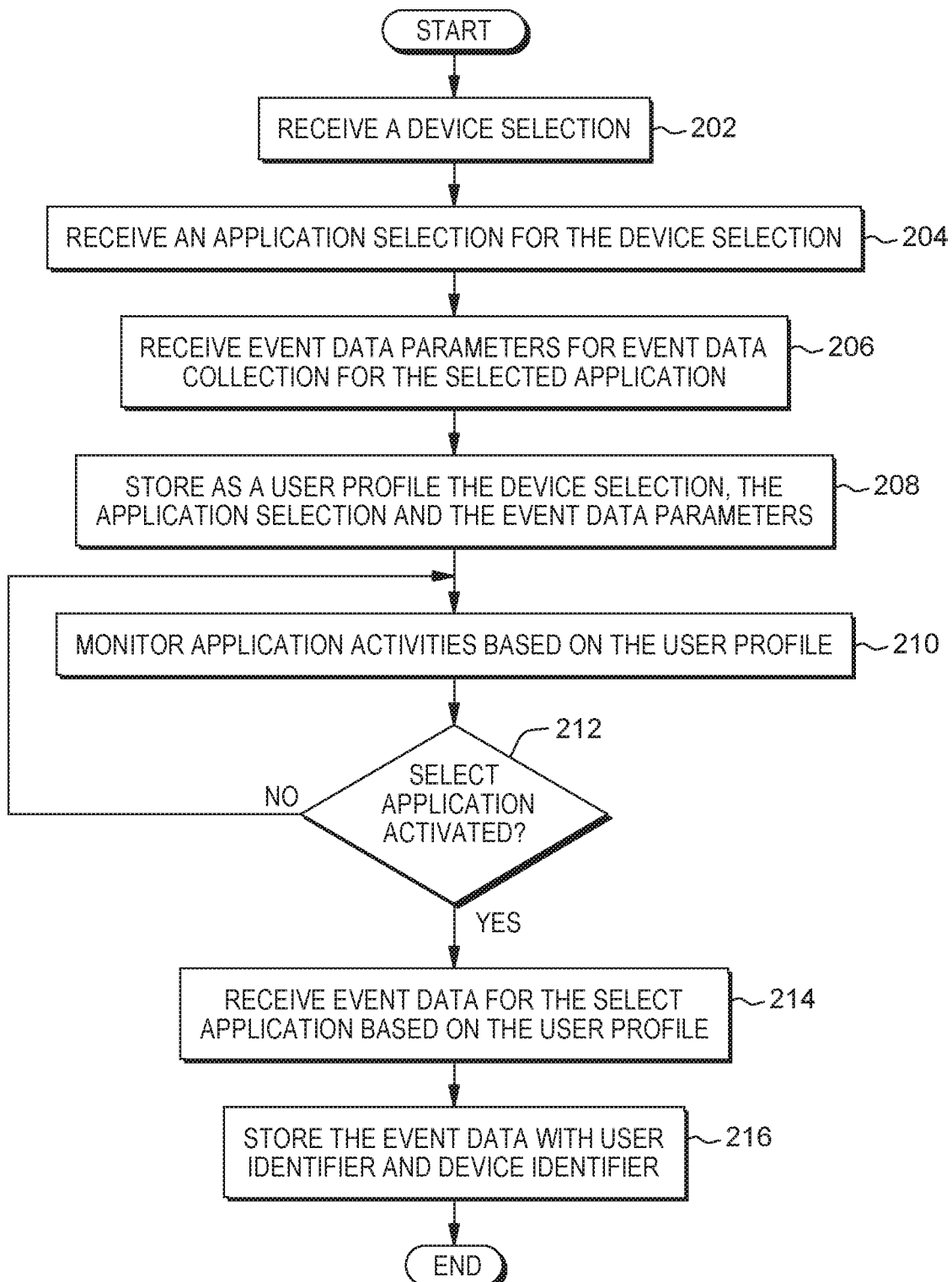
FIG. 2 is a flowchart depicting operational steps of an event verification program for managing configuration and collection of event data, in accordance with an embodiment of the present invention.

FIG. 2 is a flowchart depicting operational steps of an event verification program for managing configuration and collection of event data, in accordance with an embodiment of the present invention.

For discussion purposes, a user is associated with a plurality of electronic devices ranging from a smartphone, a tablet computer, a desktop computer, a smartwatch, or any device capable of connecting via an internet connection (i.e., IoT devices). Being associated with the plurality electronic devices represents the user having access to and/or ownership of each of the plurality of electronic devices, where the user has knowledge of one or more actions (i.e., events) performed on or by each of the plurality of electronic devices. The user can be associated with a specific user profile stored for each of the plurality of devices or if a specific user profile does not exist for a given device out of the plurality of device, a default profile for the given device out of the plurality of device. The user has the ability to identify each of the plurality of devices to be associated. Furthermore the user has the ability to identify each application on each of the plurality of device from which event data is collected. Which event data is collected from each application is identified by event data parameters, where the user has the ability to define event data parameters for the event data collected from each application. An embodiment of event verification program 110 managing configuration and collection of event data for a device is discussed below.

Event verification program 110 receives (202) a device selection. In this embodiment, event verification program 110 receives a first device selection out of a plurality of devices associated with a user. The first device selection represents the ability for event verification program 110 to utilizes the first device in a two-factor authentication process, discussed in further detail with regards to FIG. 3. Event verification program 110 can display a list of the plurality of devices connected on a similar network (i.e., Wi-Fi connection, Bluetooth connection), where a user has the ability to select the first device from the displayed plurality of devices. Alternatively, installing or downloading a client side version of event verification program 110 on a device allows for event verification program 110 to include the device in the plurality of devices from which the user selects the first device. In this embodiment, event verification program 110 receives a device selection via a user input, where the device selection is for a device on which event verification program 110 operates. In another embodiment, event verification program 110 receives a device selection via a user input, where the device selection is for a device different from a device on which event verification program 110 operates.

Event verification program 110 receives (204) an application selection for the device selection. In this embodiment, event verification program 110 receives a first application selection from a plurality of applications operating on the selected device (i.e., first device). Event verification program 110 can identify the plurality of applications operating on the selected device from which event data is collectable, where event verification program 110 is authorized to collect event data from each of the plurality of applications based on privacy settings on the selected device, each of the plurality of applications, or event verification program 110. Event verification program 110 receives an application selection for the device selection via a user input. As previously discussed with regards to FIG. 1, an application operating on the selected devices can include but is not limited to banking services, navigation services, shopping service, media streaming services, smart home management program, social media services, and supply chain management programs.

Event verification program 110 receives (206) event data parameters for event data collection for the selected application. Event verification program 110 allows for the user to identify event data parameters that defines the event data which event verification program 110 collects for each selected application from each selected device. In this embodiment, event verification program 110 receives event data parameters for event data collection for the selected application via a user input. Examples of event data parameters include but are not limited to location information, accessibility information, communication information, setting information, image information, and purchase information. Location information can represent a location where the selected application is accessed, a location searched utilizing the selected application, a mailing address associated with the selected application, a billing address associated with the selected application, and/or a location favorited utilizing the selected application. Accessibility information can represent a time and date the selected application was last accessed, a time and date authentication credentials for the selected application were last provided, and a user name and/or profile name associated with the user that last accessed the selected application. Communication information can represent a time and date of an electronic conversation through the selected application, a user name and/or profile name associated with each user partaking in an electronic conversation through the selected application, and/or message content present an electronic conversation through the selected application.

Setting information can represent a preference setting for the selected application, a preference setting for the selected device, and/or a setting associated with one or more functions of the selected application. For example, if a selected application is a mapping service, a preference setting for the selected application can include selecting a route to avoid tolls, a preference setting for the selected device can include selecting audio guidance for navigating, and a setting associated with one or more functions of the selected application can include utilizing a Wi-Fi connection in Vehicle A when available. Image information can represent a screenshot of the selected application and/or a photo taken through the selected application. Purchase information can represent a product purchased through the selected application, a product to be purchased through the selected application, a quantity of an item purchased through the selected application, a shipping address for an item purchased through the selected application, and a service purchased through the selected application.

Event verification program 110 stores (208) as a user profile, the device selection, the application selection, and the event data parameters. Event verification program 110 determines whether a user profile exists for the user providing the device selection, the application selection, and the event data parameters. In the event, event verification program 110 determines the user profile does not exist, event verification program 110 creates a new user profile and stores the as a user profile, the device selection, the application selection, and the event data parameters. In the event, event verification program 110 determines the user profile does exist, event verification program 110 updates the user profile by storing the device selection, the application selection, and the event data parameters.

Event verification program 110 monitors (210) application activities based on the user profile. A client side event verification program 110 identifies a user utilizing a device on which event verification program 110 operates, where the user is identifiable based on a user login for the device and/or an application on the device. Event verification program 110 monitors which application is activated by the user on the device based on the user profiles associated with the user that logged in on the device and/or an application on the device.

Event verification program 110 determines (212) whether a select application has been activated. In the event, event verification program 110 determines a select application has been activated ("yes" branch, 212), event verification program 110 receives (214) event data for the select application based on the user profile. In the event, event verification program 110 determines a select application has not been activated ("no" branch, 212), event verification program 110 reverts back to (210) and continues to monitor application activities based on the user profile.

Event verification program 110 receives (214) event data for the select application based on the user profile. In this embodiment, event verification program 110 receives event data for the select application based on the user profile, where the user profile includes event data parameters previously received from the user in (206). To address privacy concerns and information accessed on a device, event verification program 110 receives data according to the event data parameters previously established by the user. As a result, event verification program 110 queries the select application only for the event data outlined by the event data parameters. Event verification program 110 can receive the event data in the form of metadata and/or in the form of a video playback of a screen capture of the device on which the event data was generated by the select application.

Event verification program 110 stores (216) the event data with a user identifier and a device identifier. In this embodiment, event verification program 110 stores the event data with a user identifier sourced from the user profile that logged in on the device and/or an application on the device and a device identifier for the device from which the event data was generated by the select application. Event verification program 110 stores the event data with the user identifier and the device identifier for a predetermined amount, where the predetermined amount of time is a default amount of time or a user defined amount of time associated with the user profile and user identifier. For example, event verification program 110 utilizes 7 days as the default amount of time for storing event data for any given user identifier but utilizes 3 days as the user defined amount of time associated the a specific user profile and user identifier. Therefore, the user via the user profile can establish the amount of time event verification program 110 stores event data associated with one or more occurrences or actions performed on the select application.

Figure 3:
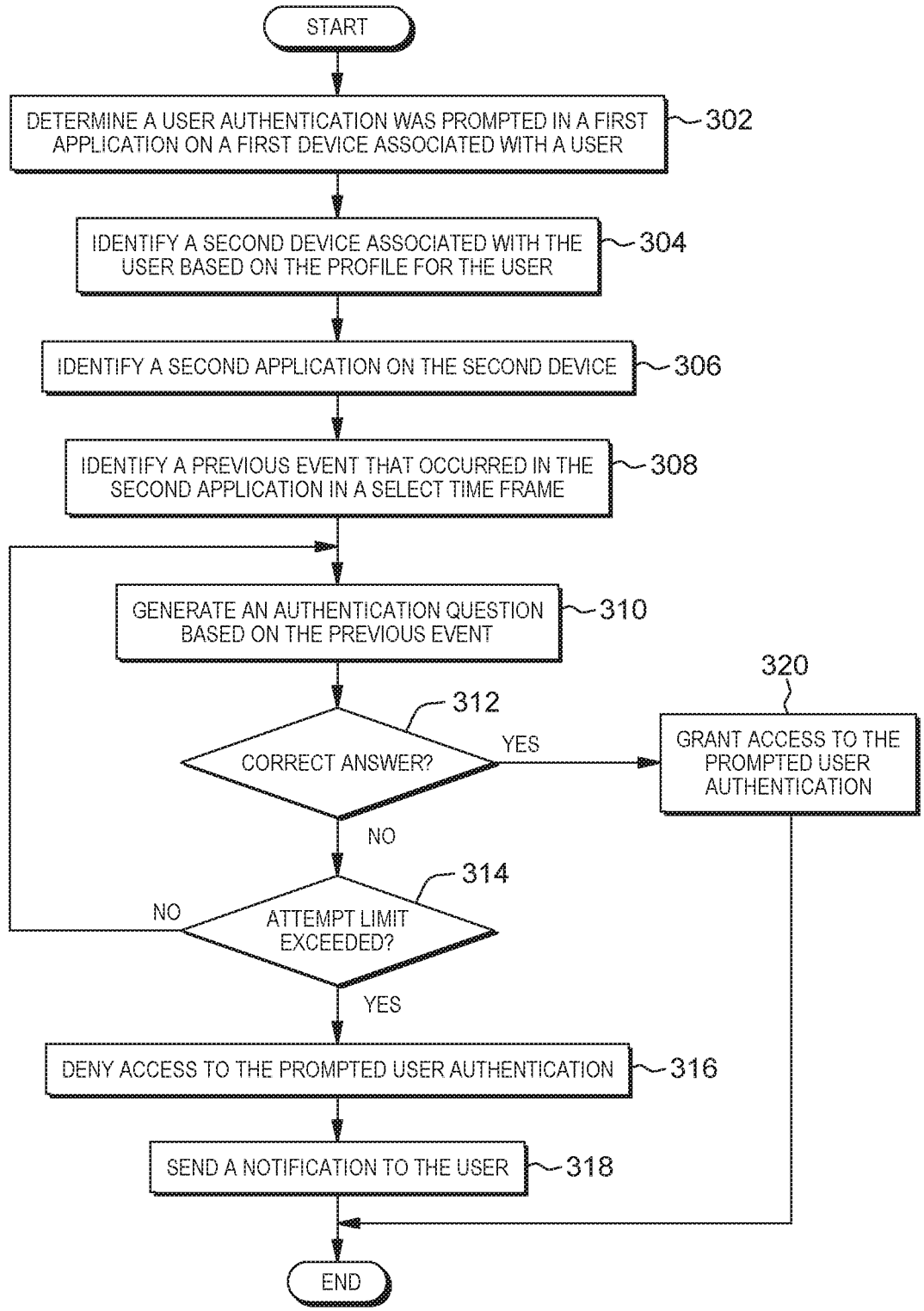
FIG. 3 is a flowchart depicting operational steps of an event verification program for a two-factor authentication process, in accordance with an embodiment of the present invention.

FIG. 3 is a flowchart depicting operational steps of an event verification program for a two-factor authentication process, in accordance with an embodiment of the present invention.

Event verification program 110 determines (302) a user authentication was prompted in a first application on a first device associated with a user. In this embodiment, event verification program 110 determines a user authentication was prompted in a first application on a first device associated with a user, where the user has to enter credentials (e.g., username and password) for authentication to access content in the first application. The first application that prompts the user authentication is an application participating the two-factor authentication process. Therefore, event verification program 110 can monitor a plurality of applications participating in the two-factor authentication process to determine when the first application out of the plurality of applications prompts a user authentication. Alternatively, event verification program 110 can monitor a user interface of the first device to determine when the first application out of the plurality of applications prompts the user for a user authentication.

In one embodiment, event verification program 110 receives the user's credentials for user authentication in the first application and prior to granting the user access to the first application, event verification program 110 initializes the two-step factor and identifies (304) a second device associated with the user based on the profile for the user. In another embodiment, subsequent to determining a user authentication was prompted in a first application on a first device associated with a user, event verification program 110 prevents a user from entering user credentials for user authentication in the first application, event verification program 110 initializes the two-step factor and identifies (304) a second device associated with the user based on the profile for the user. Event verification program 110 prevents the user from entering user credentials for user authentication in the first application by greying-out the user authentication prompt, where the user can no longer highlight one or more fields in the first application for entry of user credentials.

Event verification program 110 identifies (304) a second device associated with the user based on the profile for the user. In this embodiment, event verification program 110 identifies a second device associated with the user based one the profile of the user, where the second device is different from the first device. For example, the first device is a smartphone associated with the user and the first application is a banking service being accessed by the user through the smartphone. Event verification program 110 identifies a second device associated with the user as a smartwatch, where the smartwatch is paired with the smartphone (i.e., first device). In another example, the first device is a tablet computer associated with the user and the first application is a shopping service being accessed by the user to purchase a product. Event verification program 110 identifies a second device associated with the user based on the profile for the user that is in a vicinity of the first device (e.g., 5 meters). In another embodiment, the second device is the same hardware as the first device, where the first device operates on a first user profile and the second device operates on a second user profile.

Event verification program 110 identifies (306) a second application on the second device. In this embodiment, event verification program 110 identifies a second application on the second device that is different from the first application on the first device. Furthermore, a category (e.g., banking services) for the first application is different than a category (e.g., media streaming services) for the second application. In one example, the first application is a banking service being accessed on a smartphones and the second application that event verification program 110 identifies is a mapping service in a vehicle (i.e., second device) associated with the user. In another example, the first application is a shopping service being accessed on a tablet computer and the second application that event verification program 110 identifies is a smart home management program on a smart appliance (i.e., second device) associated with the user. The smart home mismanagement program that event verification program 110 identifies as the second application is not accessible via the first device (i.e., tablet computer).

Event verification program 110 identifies (308) a previous event that occurred in the second application in a select time frame. In this embodiment, event verification program 110 identifies a previous event that occurred in the second application in a select time frame from stored event data, previously discussed with regards to FIG. 2. The select time frame represents a default or user defined time frame in which the previous event occurred in the second application and can range from several hours to X amount of days. Event verification program 110 can utilizes an application or user specific select time frame, where the shorter of the user specific time frames takes priority. The stored event data for the second application is based on event data parameters set for the second application, where as previously mentioned, can include location information, accessibility information, communication information, setting information, image information, and purchase information. In one example, event verification program 110 identifies a previous event as a purchase through a shopping service provided by the second application that occurred 3 days prior, where 3 days is within the select time frame of 7 days (0 days×7 days). In another example, event verification program 110 identifies a previous event as a previously navigated destination through a mapping service provided by the second application that occurred 12 days prior, where 12 days is within the select time frame of 30 days (0 days×30 days). In yet another example, event verification program 110 identifies a previous event as a previously watched movie through a media streaming service provided by the second application that occurred 8 days prior, where 8 days is within the select time frame of 20 days (0 days×20 days).

In another embodiment, event verification program 110 performs event classification and selection utilizing a distance function to identify a previous event that occurred in another application, where the previous event is most dissimilar from the user authentication prompt in (302). Event verification program 110 utilizes a combination of clustering and event classification to statistically weigh each event with the distance function and select one or more events that are most dissimilar to the user authentication prompt in (302). As event verification program 110 stores event data as previously discussed in (216), event verification program 110 analyzes each event and assigns the event to one or more clusters based on a variety of parameters. The variety of parameters for clustering the events includes but is not limited to, an event category (e.g., retail, travel, online shopping, health and wellness), a timestamp (e.g., hour, day, week, month), a geographic location, a social platform, and an device identifier from where the event originated. As event verification program 110 determines the user authentication was prompted (302), event verification program 110 extracts the variety of parameters for the prompt in the first application that includes an event category for the prompt, a device identifier for the first device associated with the user, a geographic location, and a time stamp. Event verification program 110 selects a previous event by first selecting a subset of clusters based on a rule-based affinity function. For each cluster within the subset of clusters, event verification program 110 utilizes a distance function to compute a distance score between each event in each cluster and the user authentication prompt in (302).

Subsequently, event verification program 110 applies a weight factor to the distance score for each event in each cluster, where a lower weight is assigned to a similar event when compared to the user authentication prompt and a higher weight is assigned to a dissimilar event when compared to the user authentication prompt. Based on the distance score and weight factor, event verification program 110 identifies an event from the cluster with the highest score, which represents the most dissimilar event when compared to the user authentication prompt. Therefore, the authentication question that event verification program 110 generates based on the previous event is most dissimilar to the user authentication prompt in (302). In one example, a user authentication prompt occurs in a banking application on a mobile device associated with a user at 11 AM on a workday. Event verification program 110 utilizes the cluster and distance function with weighting factor to identify a previous most dissimilar to the user authentication prompt, such as, an online purchase in a retail application that occurred at 8 PM on a Saturday.

Event verification program 110 generates (310) an authentication question based on the previous event. In this embodiment, event verification program 110 generates an authentication question based on the previous event, where the authentication question is associated directly or indirectly with previous event. In one example, for a previous event that was a purchase through a shopping service that occurred 3 days prior, event verification program 110 generates a direct authentication question that states, "What item was purchased 3 days prior through shopping service A?" Event verification program 110 can request a written response or provide a list of selectable items, where one of the items from the list of items is the purchased item. Alternatively, event verification program 110 generates an indirect authentication question that states, "Which item was not purchased 3 days prior through shopping service A?", where event verification program 110 provides a list of purchased items and a single non-purchased item for choice selection. Event verification program 110 generates the authentication questions by analyzing a type of previous event and a type of application (i.e., second application) from which the previous event was identified, parsing through legible content from the previous event and the application, and compiling at least one question from the analyzing and parsing. Event verification program 110 can parse through legible content to identify an action and an item for which a direct or indirect question is generated.

In another example, for a previous event that was a previously navigated destination through a mapping service that occurred 12 days prior, event verification program 110 generates a direct authentication question that states, "Where was a destination traveled 12 days prior through mapping service A?" Event verification program 110 can request a written response or provide a list of selectable destinations, where one of the destination from the list of destination is the destination traveled to 12 days prior. Alternatively, event verification program 110 generates an indirect authentication question that states, "At what time was a destination traveled 12 days prior through mapping service A?", where event verification program 110 provides a list of selectable 6 hour time frames. Though a user might not recall an exact time of travel (i.e., direct), the selectable time frames allow for the user to recall a time window (i.e., indirect) of when the destination was traveled to. Alternatively, event verification program 110 can provide an interactive map, where a user can pinpoint a destination. Event verification program 110 generates a direct authentication question that states, "Where was a destination traveled 12 days prior through mapping service A?" and the answer to the generate direct authentication question is received through a selection on the interactive map. If the selection (i.e., pinpoint) on the interactive map is within a 1 miles radius of the destination, event verification program 110 determined the answer is correct.

In yet another example, event verification program 110 for a previous event that was a previously watched movie through a media streaming service that occurred 8 days prior, event verification program 110 generates a direct authentication question that states, "What is a title of a movie viewed 8 days prior through media streaming service A?" Event verification program 110 can request a written response or provide a list of selectable movie titles, where one of the movie titles from the list of movie title is the movie title viewed 8 days prior. Alternatively, event verification program 110 generates an indirect authentication question that states, "What category of movie was viewed 8 days prior through media streaming service A?", where event verification program 110 provides a list of selectable movie categories.

Event verification program 110 determines (312) whether a correct answer was received for the authentication question. In the event, event verification program 110 determines a correct answer was not received for the authentication question ("no" branch, 312), event verification program 110 determines (314) whether an attempt limit for answering the authentication question has been exceeded. In the event, event verification program 110 determines a correct answer was received for the authentication question ("yes" branch, 312), event verification program 110 grants (320) access to the prompted user authentication.

Event verification program 110 determines (314) whether an attempt limit for answering the authentication question has been exceeded. In the event, event verification program 110 determines an attempt limit for answering the authentication question has been exceeded ("yes" branch, 314), event verification program 110 denies (316) access to the prompted user authentication. In the event, event verification program 110 determines an attempt limit for answering the authentication question has not been exceeded ("no" branch, 314), event verification program 110 reverts back to (310) and generates an authentication question based on the previous event.

Event verification program 110 denies (316) access to the prompted user authentication. In this embodiment, event verification program 110 prevents the user from entering user credentials for user authentication in the first application by greying-out the user authentication prompt, where the user can no longer highlight one or more fields in the first application for entry of user credentials. In another embodiment, where user's credentials for user authentication in the first application were received prior to initializing the two-factor authentication process, event verification program 110 denies access to content in the first application that prompted the user authentication.

Event verification program 110 sends (318) a notification to the user. In this embodiment, event verification program 110 sends a notification to the user via a channel provided by a third party (e.g., email). The channel provided by the third party is such that the first application and/or the first device are not the means through which event verification program 110 sends the notification. The notification can include a name of the first application and a name of the first device which prompted the user authentication, along with the generated authentication question from (310) which was incorrectly answered during the two-factor authentication process. Event verification program 110 can send the notification to an email account associated with the first user, to an email account associated with both the user and the first application, and/or to an email account associated with both the user and the second application.

Event verification program 110 grants (320) access to the prompted user authentication. In this embodiment, event verification program 110 grants the user access to enter user credentials for user authentication in the first application by ceasing to grey-out the user authentication prompt, where the user can highlight one or more fields in the first application for entry of user credentials. In another embodiment, where user's credentials for user authentication in the first application were received prior to initializing the two-factor authentication process, event verification program 110 grants access to content in the first application that prompted the user authentication.

Figure 4:
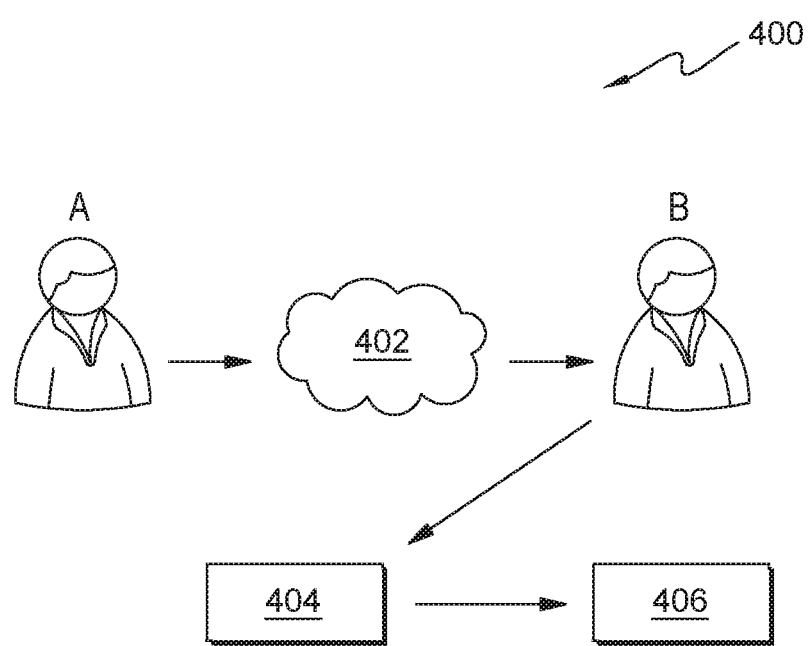
FIG. 4 is an example of a process flow of an event verification program, in accordance with an embodiment of the present invention.

FIG. 4 is an example of a process flow of an event verification program, in accordance with an embodiment of the present invention.

In this example, verbal and two-factor authentication process 400 includes individual A calling a customer assistance center with regards to a banking service, where individual B employed by the banking service initiates a two-factor authentication process prior to providing individual A assistance with regards to the first application. As individual A initializes a call with the customer assistance center, individual A interacts with individual B represented by conversation 402. During conversation 402, individual A requests a modification to an account, where the modification to the account requires verification of individual A to ensure that individual A is associated with the account. Individual B initiates a verbal authentication, where individual B requests that individual A provide a full name associated with the account, a mailing address for the account, and the last four digits of a social security number associated with the account. Upon individual B providing correct answers to the verbal authentication, individual A requests that individual B access a first application associated with the banking service by performing two-factor authentication process 404. Event verification program 110 pauses the call between individual A and individual B and initializes two-factor authentication process 404. Two-factor authentication process 404 includes event verification program 110 performing steps (302)-(312), previously discussed with regards to FIG. 3. Subsequent to event verification program 110 determining a correct answer was received for the authentication question, event verification program 110 transfers individual A back to the call with individual B, where individual B can assist with individual A's request to a modify to the account.

Figure 5:
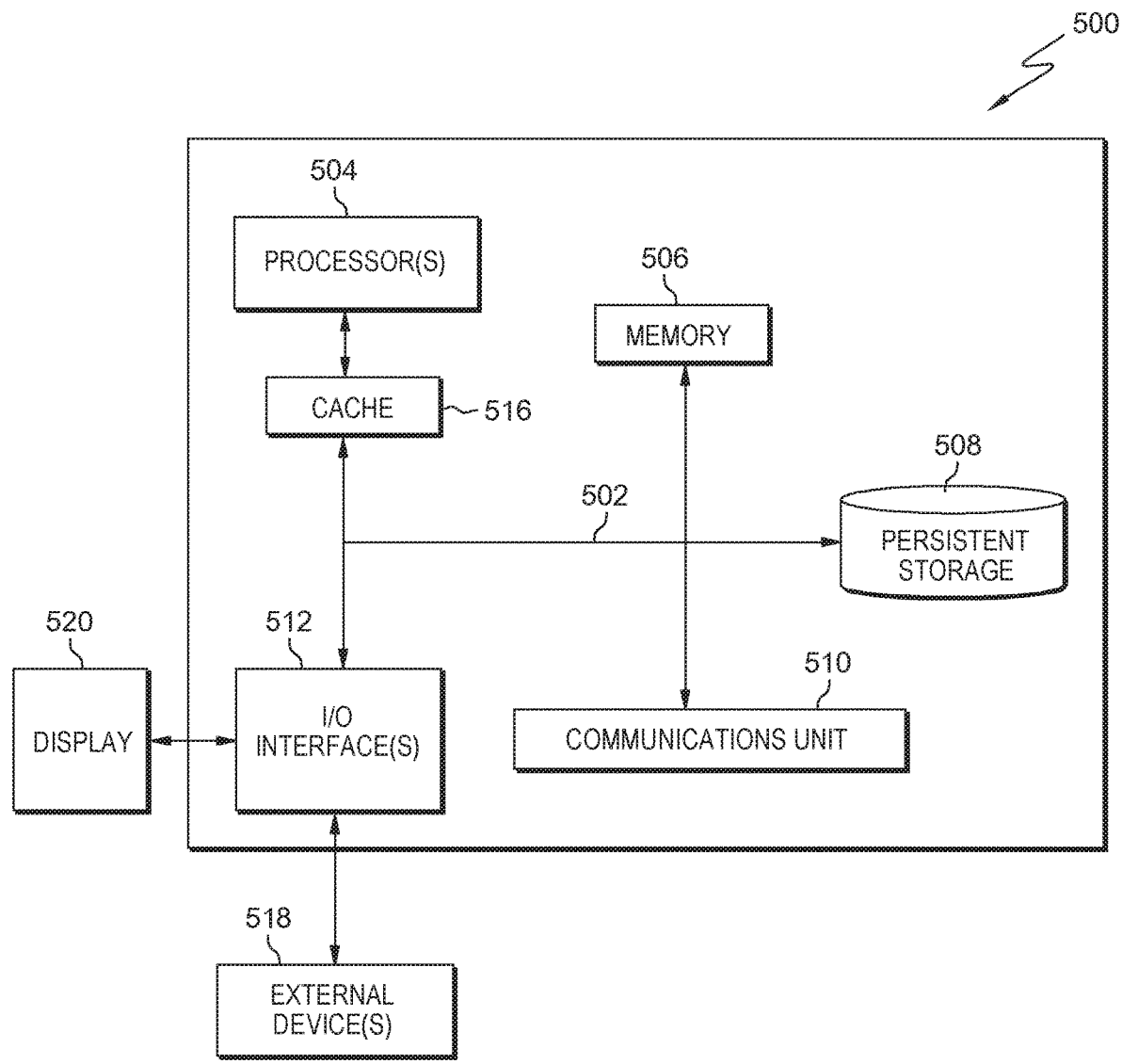
FIG. 5 is a block diagram of components of a computer system, such as the server computer of FIG. 1, in accordance with an embodiment of the present invention.

FIG. 5 depicts computer system 500, where server computer 102, client device 104, and client device 106 are examples of a system that include event verification program 110A, 110B, 110C, respectively. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 502 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 506 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
responsive to determining a first user authentication was prompted as a result of a first event in a first application on a first device associated with a user, identifying, by one or more processors, a second event from a plurality of events that occurred in a select time frame prior to the first event in the first application that resulted in the first user authentication prompt;
identifying, by one or more processors, a second application on a second device in which the second event from the plurality of events that occurred in the select time frame prior to the first event in the first application that resulted in the first user authentication prompt, wherein the second event relates to an action performed by the user in the second application;
generating, by one or more processors, an authentication question based on the second event, wherein the authentication question is a second user authentication;
responsive to determining an answer provided by the user to the authentication question is correct, granting, by one or more processors, access to the first user authentication prompt in the first application on the first device.

2. The method of claim 1 further comprising:
responsive to receiving a selection for the second device and the second application, receiving, by one or more processors, event data parameters for event data collection for the second application, wherein the event data parameters define the collection of data for the plurality of events;
storing, by one or more processors, as the user profile associated with the user, the event data parameters for the second application on the second device; and
monitoring, by one or more processors, activities for a plurality of applications on the second device based on the user profile.

3. The method of claim 2, further comprising:
responsive to determining the second application out of the plurality of applications is activated, receiving, by one or more processors, event data for the second event based on the user profile; and
storing, by one or more processors, the event data for the second event, along with a user identifier for the user and a device identifier for the second device.

4. The method of claim 1, further comprising:
performing, by one or more processors, a first alteration in a user interface of the first application on the first device, wherein the first alteration includes greying-out the first user authentication prompt, wherein highlighting one or more fields in the first application for entry of user credentials is disabled.

5. The method of claim 4, wherein granting access to the first user authentication prompt, further comprises:
performing, by one or more processors, a second alteration in the user interface of the first application on the first device, wherein the second alteration includes reversing the greying-out of the first user authentication prompt, wherein highlighting one or more fields in the first application for entry of user credentials is enabled.

6. The method of claim 1, wherein generating the authentication question based on the second event, further comprises:
responsive to analyzing the second event and the second application, parsing, by one or more processors, legible content associated with the second event and the second application;
responsive to identifying the action performed by the user in the second application, compiling, by one or more processors, the authentication question relating to the action performed by the user in the second application.

7. The method of claim 1, wherein identifying the second application on the second device based on the user profile associated with the user, further comprises:
identifying, by one or more processors, the second device out of a plurality of devices, wherein the second device is in a vicinity of the first device; and
identifying, by one or more processors, the second application out of a plurality of applications, wherein a first category for the first application is different than a second category for the second application, wherein the first category and the second category are based on a provided service.

8. The method of claim 1, further comprising:
extracting, by one or more processors, a plurality of parameters for the first user authentication prompt, wherein the plurality of parameters are selected from a group consisting of: an event category, a timestamp, a geographic location, and a device identifier;
selecting, by one or more processors, a subset cluster of events from a plurality of clusters of events utilizing a rule-based affinity function;
computing, by one or more processors, a distance score for each event in the subset cluster of events, wherein the distance score specifics a similarity between each event and the first user authentication prompt;
responsive to assigning a weight factor for each distance score based on comparable event in other clusters, selecting, by one or more processors, the second event from the plurality of events that previously occurred in the second application based on the distance score and the weight factor.

9. A computer program product comprising:
one or more non-transitory storage media and program instructions stored on at least one of the one or more non-transitory storage media, the program instructions comprising:
program instructions to, responsive to determining a first user authentication was prompted as a result of a first event in a first application on a first device associated with a user, identify a second event from a plurality of events that occurred in a select time frame prior to the first event in the first application that resulted in the first user authentication prompt;
identify a second application on a second device in which the second event from the plurality of events that occurred in the select time frame prior to the first event in the first application that resulted in the first user authentication prompt, wherein the second event relates to an action performed by the user in the second application;
generate an authentication question based on the second event, wherein the authentication question is a second user authentication;

responsive to determining an answer provided by the user to the authentication question is correct, grant access to the first user authentication prompt in the first application on the first device.

10. The computer program product of claim 9 further comprising program instructions, stored on the one or more computer readable storage media, which when executed by a processor, cause the processor to:
responsive to receiving a selection for the second device and the second application, receive event data parameters for event data collection for the second application, wherein the event data parameters define the collection of data for the plurality of events;
store as the user profile associated with the user, the event data parameters for the second application on the second device; and
monitor activities for a plurality of applications on the second device based on the user profile.

11. The computer program product of claim 10, further comprising program instructions, stored on the one or more computer readable storage media, which when executed by a processor, cause the processor to:
responsive to determining the second application out of the plurality of applications is activated, receive event data for the second event based on the user profile; and
store the event data for the second event, along with a user identifier for the user and a device identifier for the second device.

12. The computer program product of claim 9, further comprising program instructions, stored on the one or more computer readable storage media, which when executed by a processor, cause the processor to:
perform a first alteration in a user interface of the first application on the first device, wherein the first alteration includes greying-out the first user authentication prompt, wherein highlighting one or more fields in the first application for entry of user credentials is disabled.

13. The computer program product of claim 12, wherein granting access to the first user authentication prompt, further comprises program instructions, stored on the one or more computer readable storage media, which when executed by a processor, cause the processor to:
perform a second alteration in the user interface of the first application on the first device, wherein the second alteration includes reversing the greying-out of the first user authentication prompt, wherein highlighting one or more fields in the first application for entry of user credentials is enabled.

14. The computer program product of claim 9, wherein generating the authentication question based on the second event, further comprises program instructions, stored on the one or more computer readable storage media, which when executed by a processor, cause the processor to:
responsive to analyzing the second event and the second application, parse legible content associated with the second event and the second application;
responsive to identifying the action performed by the user in the second application, compile the authentication question relating to the action performed by the user in the second application.

15. The computer program product of claim 9, wherein identifying the second application on the second device based on the user profile associated with the user, further comprises program instructions, stored on the one or more computer readable storage media, which when executed by a processor, cause the processor to:
identify the second device out of a plurality of devices, wherein the second device is in a vicinity of the first device; and
identify the second application out of a plurality of applications, wherein a first category for the first application is different than a second category for the second application, wherein the first category and the second category are based on a provided service.

16. The computer program product of claim 9, further comprising program instructions, stored on the one or more computer readable storage media, which when executed by a processor, cause the processor to:
extract a plurality of parameters for the first user authentication prompt, wherein the plurality of parameters are selected from a group consisting of: an event category, a timestamp, a geographic location, and a device identifier;
select a subset cluster of events from a plurality of clusters of events utilizing a rule-based affinity function;
compute a distance score for each event in the subset cluster of events, wherein the distance score specifics a similarity between each event and the first user authentication prompt;
responsive to assigning a weight factor for each distance score based on comparable event in other clusters, select the second event from the plurality of events that previously occurred in the second application based on the distance score and the weight factor.

17. A computer system comprising:
one or more computer processors;
one or more computer readable storage media; and
program instructions stored on the computer readable storage media for execution by at least one of the one or more computer processors, the program instructions comprising:
program instructions to, responsive to determining a first user authentication was prompted as a result of a first event in a first application on a first device associated with a user, identify a second event from a plurality of events that occurred in a select time frame prior to the first event in the first application that resulted in the first user authentication prompt;
identify a second application on a second device in which the second event from the plurality of events that occurred in the select time frame prior to the first event in the first application that resulted in the first user authentication prompt, wherein the second event relates to an action performed by the user in the second application;
generate an authentication question based on the second event, wherein the authentication question is a second user authentication;
responsive to determining an answer provided by the user to the authentication question is correct, grant access to the first user authentication prompt in the first application on the first device.

18. The computer system of claim 17 further comprising program instructions, stored on the one or more computer readable storage media, which when executed by a processor, cause the processor to:
responsive to receiving a selection for the second device and the second application, receive event data parameters for event data collection for the second application, wherein the event data parameters define the collection of data for the plurality of events;

store as the user profile associated with the user, the event data parameters for the second application on the second device; and monitor activities for a plurality of applications on the second device based on the user profile.

19. The computer system of claim 18, further comprising program instructions, stored on the one or more computer readable storage media, which when executed by a processor, cause the processor to:

responsive to determining the second application out of the plurality of applications is activated, receive event data for the second event based on the user profile; and store the event data for the second event, along with a user identifier for the user and a device identifier for the second device.

20. The computer system of claim 17, further comprising program instructions, stored on the one or more computer readable storage media, which when executed by a processor, cause the processor to:

perform a first alteration in a user interface of the first application on the first device, wherein the first alteration includes greying-out the first user authentication prompt, wherein highlighting one or more fields in the first application for entry of user credentials is disabled.

\* \* \* \* \*